Figure 1:
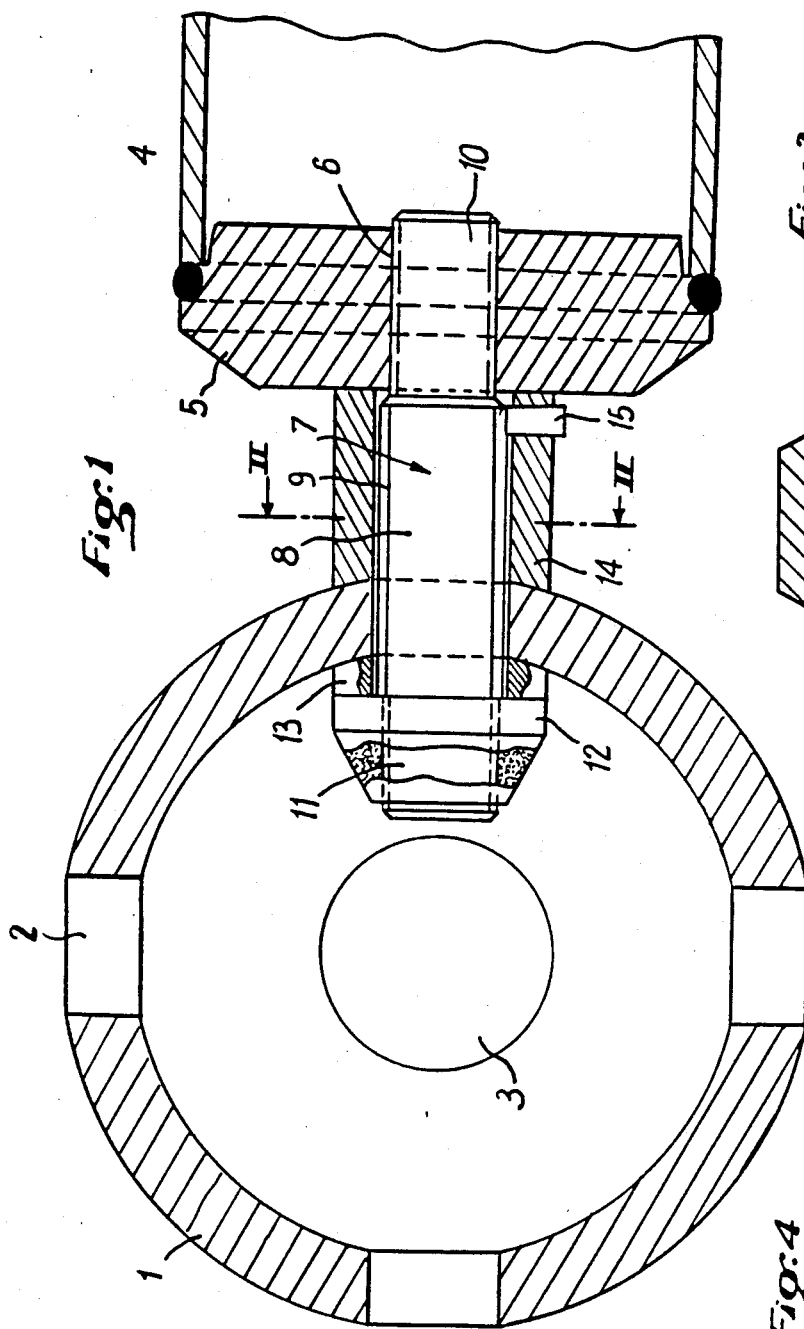

United States Patent [19]

Chamayou dit Felix

[11] Patent Number: 4,806,041
[45] Date of Patent: Feb. 21, 1989

[54] DEVICE FOR JOINING TUBES OR BARS

[76] Inventor: Gérard Chamayou dit Felix, 93 Rue Broca, 75013 Paris, France

[21] Appl. No.: 932,275

[22] Filed: Nov. 19, 1986

[30] Foreign Application Priority Data

Nov. 19, 1985 [FR] France ................. 85 17055
Dec. 27, 1985 [FR] France ................. 85 19308

[51] Int. Cl.⁴ .................................. F16B 7/18
[52] U.S. Cl. ................................... 403/171; 403/176; 403/259; 403/268; 403/296
[58] Field of Search ............... 403/230, 171, 176, 170, 403/240, 268, 372, 173, 172, 169, 247, 258–260, 252, 359, 378, 296, 299, 343, 342, 19; 52/648

[56] References Cited

U.S. PATENT DOCUMENTS

| | | | |
|---|---|---|---|
| 1,914,260 | 6/1933 | Kennedy | 403/259 |
| 3,995,962 | 12/1976 | Mylaeus | 403/171 X |
| 4,011,020 | 3/1977 | Frantl et al. | 403/268 X |
| 4,027,449 | 6/1977 | Alcalde-Cilveti | 403/176 X |
| 4,129,206 | 12/1978 | Talbott | 403/372 X |
| 4,161,088 | 7/1979 | Gugliotta et al. | 403/176 X |
| 4,193,706 | 3/1980 | Eberlein et al. | 403/19 |
| 4,313,687 | 2/1982 | Martinez Apeztegui et al. | 403/171 |
| 4,353,662 | 10/1982 | DuChateau | 403/171 |
| 4,666,326 | 5/1987 | Hope | 403/265 X |
| 4,692,054 | 9/1987 | Kirby | 403/171 |

FOREIGN PATENT DOCUMENTS

| | | | |
|---|---|---|---|
| 081608 | 12/1981 | European Pat. Off. | |
| 2426973 | 12/1975 | Fed. Rep. of Germany | |
| 2457674 | 10/1976 | Fed. Rep. of Germany | 403/176 |
| 2736635 | 10/1978 | Fed. Rep. of Germany | |
| 1181458 | 5/1958 | France | 403/296 |
| 2273914 | 6/1975 | France | |
| 2434903 | 9/1978 | France | |
| 2439935 | 10/1978 | France | |
| 2474641 | 1/1980 | France | |
| 591570 | 8/1947 | United Kingdom | 403/296 |
| 1189235 | 4/1970 | United Kingdom | |

Primary Examiner—Andrew V. Kundrat
Assistant Examiner—Peter M. Cuomo
Attorney, Agent, or Firm—Charles W. Fallow; Martin P. Hoffman; Mitchell B. Wasson

[57] ABSTRACT

The invention relates to a device for tubes or rods provided with tapped tips.

It comprises a hollow hub (1) comprising a plurality of holes (2, 3) and at least two bolts (7), each having a thread (10, 11) at each of its ends, each bolt going through one of the holes (2) and having its thread (11) interior to the hub screwed to a nut (12) and its outside thread (10) screwed to tip (9) of one of the tubes or rods (4), one of holes (3) having dimensions greater than those of the nuts to allow the introduction of the nuts into the hub, locking means (14) being provided to assure the locking of each bolt on the corresponding tip.

12 Claims, 2 Drawing Sheets

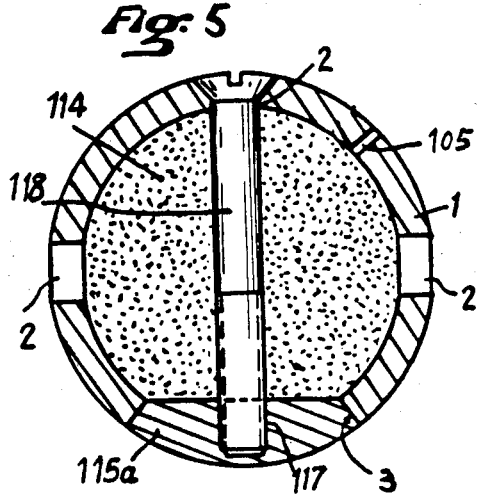
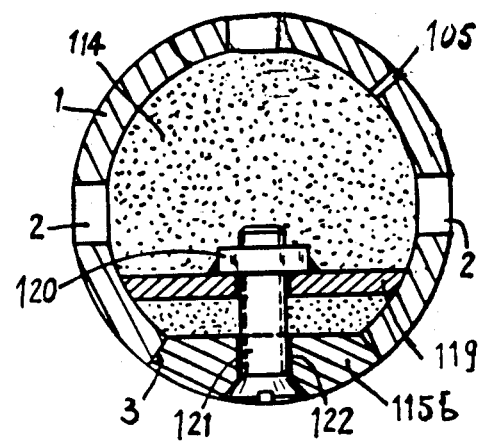
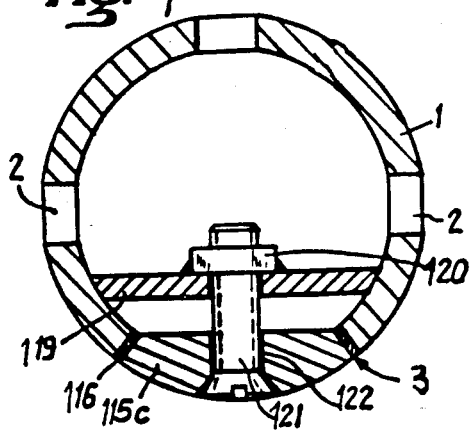
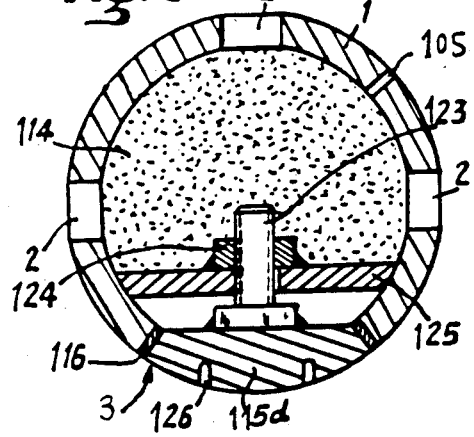

DEVICE FOR JOINING TUBES OR BARS

This invention relates to a device for joining of a first element to a second element, such as tubes or rods, provided with tapped ends.

Such devices are already known in which the ends of a plurality of tubes or rods are joined at an assembly hub. However, these known devices exhibit the drawback that, to permit the screwing of the ends of the tubes, the hubs must be largesized and consequently heavy, onerous and unesthetic.

This invention aims at reducing this drawback.

For this purpose, the invention first of all has as its object a device for joining a first element to a second element provided with a tapped tip, comprising a bolt able to work with said tip and provided with a head made to be kept in said first element, characterized in that it comprises locking means comprising a ring, solid in rotation with the body of said bolt and able to slide freely on said body.

The invention also has as its object a joining device for tubes or rods provided with tapped tips, characterized in that it comprises a hollow hub comprising a plurality of holes and at least two bolts each having a thread at each of its ends, each bolt going through one of said holes and having its thread interior to the hub screwed to a nut and its outside thread screwed to the tip of one of said tubes or rods, one of the holes having dimensions greater than those of the nuts to allow introduction of the nuts into said hub, locking means being provided to assure locking of each bolt on the corresponding tip.

The fact of using a separate bolt and nut offers a certain number of advantages.

First, the hole through which the nuts are introduced should have only dimensions just larger than these nuts.

The mechanical strength of the hub therefore is only very slightly reduced.

Moreover, it is not necessary to provide for handlings of the bolt inside the hub. Consequently, the hub can have small dimensions.

The locking means can comprise, for example, a locking ring engaged on the body of the bolt between the two threads, said ring being solid in rotation with the body but able to slide freely on it.

Assembly then is performed by introducing a nut on the inside of the hub, causing the corresponding thread of one of the bolts to penetrate through one of the holes, screwing the nut on this thread then, with the locking ring, making the bolt turn to engage its other thread in the tapped tip of the tube or rod.

In this way it is possible to join two or more tubes or rods to the hub.

In a particular embodiment of the invention, when the bolt is locked, the ring has one of its ends resting on the outside surface of the hub and the other end resting on said tip.

Thus, an excellent mechanical strength of the connection between the tube and hub is obtained because the bolt is then in traction between the nut interior to the hub and the tip, while the ring is in compression.

To assure longitudinal sliding of the ring on the body of the bolt and driving in rotation, this body and the inside surface of the ring can comprise complementary longitudinal grooves.

Advantageously, movable means can be provided to prevent sliding of the ring on the body of the bolt.

These means have two functions. On the one hand, they prevent the separation of the ring and bolt before assembly, in particular avoiding the loss of the ring.

Moreover, they make it possible suitably to present the end of the thread of the bolt in relation to the beginning of the tapping of the tip and thus facilitate the start of the screwing.

These movable means can, for example, comprise a pin engaged by force in a radial hole of the ring and having its inside end resting on the body of the bolt, or again comprise a clip pinched on the ring and provided with a projection engaged in the outside thread of the bolt.

Advantageously, the two threads of each bolt go in opposite directions so that when the bolt is locked on the tip, the locking of the bolt on the nut is thereby increased.

In a particular embodiment of the invention, the hub is approximately spherical, but other shapes can, of course, be considered.

In case the assembled structure is subjected to a difficult environment that can cause detrimental consequences at the hub as a result of gel or corrosion phenomena, it is possible advantageously to provide at least an added sealing element able to insulate the inside cavity of the hub from the outside in an airtight manner.

In a first embodiment, the sealing element consists of a compressible sealing ring placed between the opposite faces of the plug and the wall of the orifice housing it.

In a second embodiment, the sealing element consists of a hardenable mass injected through an injection orifice provided for this purpose in the wall of the hub and at least partially filling the inside cavity of the hub. As hardenable mass there can be cited, for example, cement or expandable foams, for example, closed-cell polyurethane foams.

The sealing material can be injected directly into the cavity or inside a deformable pocket placed in the cavity.

It is also possible according to the invention to make the seal by associating the sealing element of the first embodiment and the sealing element of the second embodiment.

Figure 3:
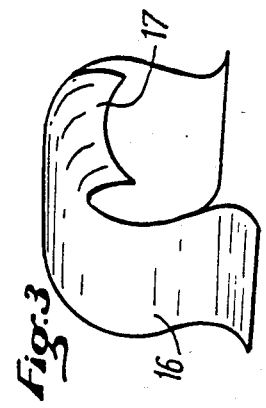
Figure 2:
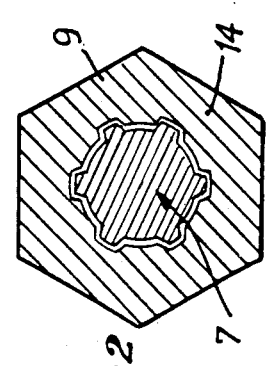
Figure 4:
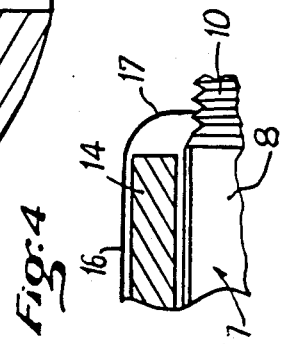

Particular embodiments of the invention will now be described with reference to the accompanying diagrammatic drawings in which:

FIG. 1 is a view in section of a first device according to the invention on which a single tube is mounted, FIG. 2 is a view in section along line II—II of FIG. 1, FIG. 3 is a perspective view of a clip according to the invention, FIG. 4 is a partial view in section showing the clip of FIG. 3 mounted on the device, FIG. 5 illustrates in section a second embodiment of the invention, in which the connecting bolts have not been represented, FIG. 6 is a view similar to FIG. 5 illustrating another embodiment, FIG. 7 is a similar view illustrating another embodiment, and FIG. 8 is a similar view representing another embodiment.

The device according to FIG. 1 comprises a hollow spherical hub 1 in which are made small-sized holes and a larger-sized hole 3 able to be closed by a plug in the form of a cap whose various embodiments are illustrated in FIGS. 5 to 8 under references 115a to 115d.

The number of holes 2 depends on the number of tubes such as 4 which it is desired to join to hub 1.

Tubes 4 are provided at their ends with tips 5 in which is formed an inside thread 6.

A bolt 7 comprises a central body 8 on whose surface are formed longitudinal grooves 9. On the other hand, bolt 7 has at one of its ends a thread 10 corresponding to inside thread 6 and at its other end a thread 11 in the direction opposite to thread 10.

Thread 11 which, as will be seen below, is intended to work on the inside of hub 1, preferably has a section greater than that of thread 10. This latter can actually be checked much more easily.

Bolt 7 is engaged on the inside of one of holes 2 so that its thread 11 can be screwed to a nut 12. A washer 13 is inserted between nut 12 and the inside surface of sphere 1.

A ring 14, whose inside surface is provided with grooves corresponding to grooves 9 of the bolt body, is engaged on this body to be able to drive it in rotation, for example, with a key.

A pin 15, for example, of plastic, is engaged by force in a radial hole of the ring until coming in contact with body 8 of bolt 7 temporarily to prevent ring 14 from sliding in relation to this bolt.

Washer 13 and nut 12 having been introduced into sphere 1 through hole 3, whose dimensions are provided for this purpose, bolt 7 is screwed to nut 12 and the end of thread 10 is engaged in inside thread 6 being aided by ring 14 which is still solid with the bolt.

Pin 15 is then withdrawn and thread 10 is screwed into inside thread 6 by making bolt 7 turn with the aid of ring 14 by grooves 9. When the ends of ring 14 comes to rest, on the one hand, on the outside surface of sphere 1 and, on the other hand, on tip 5, the two threads 10 and 11 are locked, the one in inside thread 6 and the other in nut 12, because these two threads go in opposite directions.

Tube 4 is thus made firmly solid with sphere 1.

Other tubes 4 can then be joined to spherical hub 1 at the other holes 2.

FIGS. 3 and 4 represent a variant of the means making ring 14 temporarily solid in relation to bolt 7.

A clip 16 is mounted on ring 14 by pinching and has a projection 17 turned down toward the bolt to come to engage in the threads of thread 10. Clip 16 is kept on locking ring 14 as long as thread 10 is not engaged in inside thread 6. When this happens, clip 7 is withdrawn and the locking is performed as above.

In the embodiments illustrated in FIGS. 5 and 6, the sealing element is a hardenable mass 114 filling the inside cavity of the hub and injected through a small-sized injection orifice 105 made in the wall of hub 1. Besides its sealing function, mass 114 performs an additional function of locking inside locking nuts 12.

In the embodiment of FIG. 7, the sealing element is a compressible sealing ring 116 with a tapered profile placed between tapered bearing surfaces opposite orifice 3 made in the hub and the plug in the form of cap 115c.

In the embodiment of FIG. 8, two sealing elements are provided, namely, on the one hand, a hardenable mass 114 filling the cavity of the hub and, on the other hand, a compressible sealing ring also placed between tapered bearing surfaces opposite orifice 3 and plug 115d.

Plug 115a illustrated in FIG. 5 is made solid with the hub, being provided with an inside thread 117 in which is engaged a bolt 118 introduced through a hole 2 diametrically opposite orifice 3.

In the embodiment of FIG. 6, to immobilize plug 115b a brace 119 is provided which is provided with an insert nut 120 into which is screwed a bolt 121 engaged in a hole 122 provided for this purpose in plug 115b.

The same assembly is provided for plug 115c of the embodiment of FIG. 7.

FIG. 8 shows a variant plug 115d whose inside face is solid with a bolt 123 engaging by screwing into a nut 124, itself solid with a brace 125.

In this embodiment, plug 115d in a way constitutes the head of bolt 123 and can be driven in rotation by a maneuvering key (not shown) engaging in notches 126 made for this purpose in the outside wall of plug 115d.

Different variants and modifications can, of course, be made to the above description without thereby going outside the framework or spirit of the invention.

Thus, in particular, the grooves which allow the longitudinal sliding of the ring on the bolt body while assuring the driving in rotation could optionally be replaced by one or more stationary lugs fastened to the bolt body and working with longitudinal slots of the ring.

I claim:

1. A device for assembling rods or tubes provided with tapped tips, said device comprising
    a hollow hub comprising a wall defining an interior chamber and having a plurality of holes therein,
    at least two studs, each of said studs having a first helical thread at one end thereof, and a second helical thread at the other end thereof, said first and second threads having opposite hand, each of said studs being inserted through a respective one of said holes so that one of said ends is within said chamber,
    a nut installed on each threaded stud end within said chamber, the oppositely threaded end outside said chamber thus being available for engaging the tapped tip of a respective rod,
    one of said holes having dimensions greater than those of said nuts to allow the nuts to be inserted into the chamber, and
    means for locking each stud to its corresponding tip.

2. A device according to claim 1, wherein said hub is approximately spherical.

3. A device according to claim 1, wherein said chamber wall has therein:
    an aperture larger than said holes, and further comprising a plug inserted in said aperture, means on said plug for securing it to the hub, and at least one sealing element for hermetically insulating the interior cavity of the hub from the outside.

4. A device according to claim 3, wherein the sealing element comprises a compressible sealing ring placed between opposite faces of the plug and said aperture.

5. A device according to claim 3, wherein the sealing element comprises a hardenable mass of material injected through an injection orifice provided in the wall of the hub and at least partially filling the inside cavity of the hub.

6. A device according to claim 3, wherein the sealing element comprises both a compressible sealing ring placed between opposite faces of the plug and the sides of said aperture and a hardenable mass of material injected through an injection orifice provided in the wall of the hub and at least partially filling the inside cavity of the hub.

7. A device according to claim 1, wherein said stud has a body portion between its threaded ends, and said locking means comprise a locking ring engaged on said body portion, said ring being rotationally coupled to said body portion but able to slide freely upon it.

8. A device according to claim 7, wherein, when the stud is locked, said ring has one of its ends resting on an outside surface of the hub and its other end resting against said tip.

9. A device according to claim 7, wherein the stud body portion and the inside surface of the ring are provided with interlocking longitudinal grooves.

10. A device according to claim 7, further comprising removable means for retaining the ring on the stud body portion.

11. A device according to claim 10, wherein said ring has a radial hole therein, and said removable means comprise a pin engaged by force fit in said radial hole of the ring and having its inside end resting on the stud body.

12. A device according to claim 10, wherein said removable means comprise a clip pinched on the ring and provided with a projection engaged with that threaded stud end outside the hub.

* * * * *